US012725067B2

(12) United States Patent
Bouchard et al.

(10) Patent No.: US 12,725,067 B2
(45) Date of Patent: Sep. 1, 2026

(54) QUANTUM CIRCUIT BASED ON PROGRAMMABLE OPTICAL ULTRAFAST TEMPORAL INTERFEROMTERIC NETWORK ELEMENTS

(71) Applicant: NATIONAL RESEARCH COUNCIL OF CANADA, Ottawa (CA)

(72) Inventors: Frederic Bouchard, Gatineau (CA); Duncan England, Ottawa (CA); Kent Bonsma-Fisher, Ottawa (CA); Philip J. Bustard, Ottawa (CA); Khabat Heshami, Orleans (CA); Benjamin Sussman, Ottawa (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 973 days.

(21) Appl. No.: 17/967,307

(22) Filed: Oct. 17, 2022

(65) Prior Publication Data

US 2024/0135221 A1 Apr. 25, 2024

(51) Int. Cl.
*G06N 10/00* (2022.01)
*G06N 10/20* (2022.01)
*G06N 10/40* (2022.01)

(52) U.S. Cl.
CPC ............. *G06N 10/40* (2022.01); *G06N 10/20* (2022.01)

(58) Field of Classification Search
CPC ........ G06N 10/00; G06N 10/20; G06N 10/40; G06N 10/60; G06N 10/70; G06N 10/80
See application file for complete search history.

(56) References Cited

U.S. PATENT DOCUMENTS

| | | | | |
|---|---|---|---|---|
| 7,019,875 | B2 * | 3/2006 | Pittman | B82Y 10/00 359/107 |
| 12,019,354 | B2 * | 6/2024 | Thompson | G02F 3/00 |
| 12,159,200 | B2 * | 12/2024 | Semo | H10D 48/383 |
| 2005/0167578 | A1 * | 8/2005 | Riza | G01N 21/23 250/225 |
| 2012/0015376 | A1 * | 1/2012 | Bornhop | G01N 21/45 435/7.1 |
| 2020/0409232 | A1 * | 12/2020 | Weiner | G06N 10/20 |
| 2022/0172096 | A1 * | 6/2022 | Rudolph | G06N 10/40 |
| 2023/0208532 | A1 * | 6/2023 | Bouchard | G02B 27/286 398/140 |
| 2023/0367176 | A1 * | 11/2023 | Clemmen | G02F 1/3526 |

(Continued)

OTHER PUBLICATIONS

Kupchak et al., "Terahertz-Bandwidth Switching of Heralded Single Photons", Mar. 2019, Optics Letters, vol. 44, No. 6, pp. 1427-1430 (Year: 2019).*

(Continued)

*Primary Examiner* — Paulinho E Smith
(74) *Attorney, Agent, or Firm* — Perry + Currier

(57) ABSTRACT

A quantum computing system is set forth, comprising a photon source for generating short duration single photon pulses, at least one temporal interferometric network for time-bin encoding each short duration single photon pulse in a single spatial mode, wherein the temporal interferometric network includes at least one optical switch, at least one birefringent material and at least one polarization element, and a photon detector for detecting time-of-arrival of photons output from the temporal interferometric network to measure the state of the photons.

13 Claims, 2 Drawing Sheets

(56) References Cited

U.S. PATENT DOCUMENTS

| | | | | |
|---|---|---|---|---|
| 2023/0393447 | A1* | 12/2023 | Thompson | G06N 10/40 |
| 2024/0393659 | A1* | 11/2024 | Cable | G02F 1/225 |
| 2025/0233673 | A1* | 7/2025 | Macquarrie | G06N 10/40 |

OTHER PUBLICATIONS

Kupchak et al., “Time-bin-to-Polarization Conversion of Ultrafast Photonic Qubits”, 2017, Physical Review, pp. 1-5 (Year: 2017).*

Steinlechner et al., “Distribution of High-Dimensional Entanglement via an Intra-City Free-Space Link”, Jul. 24, 2017, Nature Communications, pp. 1-7. (Year: 2017).*

Kupchak et al., “THz-Bandwidth All-Optical Switching of Heralded Single Photons”, Jun. 12, 2018, arXiv.com, pp. 1-6 (Year: 2018).*

Thew et al., “A Bell-type Test of Energy-time Entangled Qutrits”, Feb. 6, 2004, arXiv.com, pp. 1-4 (Year: 2004).*

Tanzilli et al., “A Photonic Quantum Information Interface”, Sep. 2005, Nature, pp. 116-120 (Year: 2005).*

Ikuta et al., “Four-Dimensional Entanglement Distribution over 100km”, Jan. 16, 2018, Scientific Reports, pp. 1-7 (Year: 2018).*

Kupchak et al. “Terahertz-bandwidth switching of heralded single photons.” Optics letters 44.6 (2019): 1427-1430.

Bouchard et al. “Quantum communication with ultrafast time-bin qubits.” PRX Quantum 3.1 (2022): 010332.

Madsen et al. “Quantum computational advantage with a programmable photonic processor.” Nature 606.7912 (2022): 75-81.

Humphreys et al. “Linear optical quantum computing in a single spatial mode.” Quantum Information and Measurement. Optica Publishing Group, 2014.

Clements et al. “Optimal design for universal multiport interferometers.” Optica 3.12 (2016): 1460-1465.

England et al. “Perspectives on all-optical Kerr switching for quantum optical applications.” Applied Physics Letters 119.16 (2021): 160501.

* cited by examiner

QUANTUM CIRCUIT BASED ON PROGRAMMABLE OPTICAL ULTRAFAST TEMPORAL INTERFEROMTERIC NETWORK ELEMENTS

BACKGROUND OF THE INVENTION

1. Field of the Invention

The present invention is directed to quantum information processing, and more particularly to a quantum circuit based on programmable optical ultrafast temporal interferometric network elements.

2. Description of the Related Art

Most quantum computing systems are based on the quantum bit, or "qubit", which is somewhat analogous to a binary digit (i.e. bit) in classical computing. A qubit can be in a 1 or 0 quantum state, or in a superposition of the 1 and 0 states. When it is measured, however, a qubit is always 0 or 1, where the probability of either outcome depends on the quantum state of the qubit immediately prior to measurement. There are several models of quantum computation, the most widely used being quantum circuits, which can be analogized to classical electrical circuits, but wherein a computation is performed by a sequence of quantum gates, measurements and initializations of qubits. Quantum circuits are represented graphically using horizontal lines to represent evolution of the quantum state over time, starting at the left hand side and ending at the right. Elements that connect the horizontal lines perform optical processing operations on the qubits, such as measurements or gates, which define a sequence of events.

Quantum information processing is a fundamental component in quantum computing systems. In particular, quantum computing, quantum sensing, and quantum communication are examples of transformative technologies that each depend heavily on the processing of information at the quantum level. The development of quantum technologies has included the investigation of a wide range of physical systems, e.g. atomic systems, trapped ions, spin systems in semiconductors, superconducting qubits, and quantum particles of light, namely photons. Photons distinguish themselves from other systems by having long and robust coherence properties, even at room temperature, making them useful in tasks requiring the distribution of quantum states over long distances, as is the case in quantum communication. However, a challenge with using photons in such systems is the difficulty in arbitrarily generating and manipulating quantum states of light from a single photon level to more complex large multi-photon states. Thus, it is an object of this specification to address the problem of developing a photonic quantum processor to generate and control these states in order to advance the application of photons in a wide range of quantum computing and sensing tasks.

It is an aim of photonic quantum information processing to manipulate single photons at high modulation speeds, efficiencies, and fidelities while introducing low amounts of noise. In particular, most photonic quantum information processing systems require arbitrary and programmable transformations on photonic states encoded in a large number of modes. Moreover, it is an aim of photonic quantum circuits to provide seamless integration with the photon generation and detection apparatus, or to the quantum communication channel.

It is known in the prior art to provide photonic quantum circuits that are based on spatial mode encoding of single photons. Although temporal encoding platforms have been proposed in the literature, current designs of such platforms are limited in terms of scalability. Spatial encoding platforms are known based on bulk optical circuits that use beam splitters and phase shifters, and integrated photonics designs that use integrated waveguides, directional couplers, and deformation-induced phase shifts. Bulk optical circuits can be unavoidably large and limited in terms of stability, scalability, and adaptability to various applications. For integrated silicon-based platforms, waveguide optical circuits can be fabricated using different techniques such as photolithography, UV writing, and femtosecond laser writing. However, experimental demonstrations of quantum information processing tasks have been limited to a low number of optical modes. In order to demonstrate a clear quantum advantage in the processing of quantum information, the number of modes must be scaled to a significantly larger number.

Bulk optical circuits where spatial modes are used to encode quantum information are limited in terms of scalability, phase stability, re-programmability, and integration to other devices. In particular, as larger amounts of information are processed, such bulk optical circuits require a larger number of spatial modes, which results in a large number of input and output waveguides, and physical components for quantum processing. Each such element introduces insertion loss thereby contributing to overall performance degradation of the bulk optical circuit. For example, on-chip devices generally suffer from coupling losses as well as propagation losses depending on the material used. As more physical components are added, the physical distance among modes can result in a decrease in phase stability, which can degrade the performance of a quantum processor. Due to these limitations, published prior art quantum processors have been limited to a small number of modes, i.e. less than 20 modes for fully-programmable devices.

It is also known to encode and process information in the temporal domain using fiber-loops and time-delayed interferometers, both of which suffer from many of the limitations discussed above in connection with spatial encoding platforms. In particular, due to the pulse duration used in such systems, the physical components must have optical path differences on the order of tens of centimeters, which makes the devices susceptible to phase instabilities.

Temporal encoding system have been proposed with the aim of improving scalability. L. S. Madsen, F. Laudenbach, M. F. Askarani, F. Rortais, T. Vincent, J. F. Bulmer, F. M. Miatto, L. Neuhaus, L. G. Helt, M. J. Collins, et al., Nature 606, 75 (2022) set forth a fully programmable temporal quantum processor that can be extended to a large number of modes for enabling new quantum information processing tasks. In Physical Review Letters 111, 150501 (2013), Humphreys, B. J. Metcalf, J. B. Spring, M. Moore, X.-M. Jin, M. Barbieri, W. S. Kolthammer, and I. A. Walmsley disclose a proposed temporal encoding system wherein photons are kept in a single spatial mode, e.g. a single-mode fiber, resulting in a large coupling efficiency, low propagation loss, and good mode overlap with sources and detectors. In the aforementioned works, the temporal separation among the time bins are several orders of magnitude larger than the ultrafast level we are proposing. The large time-bin separation times may result in several limitations for scalability. Particularly, they require much longer path differences in the interferometers, which will reduce phase stability over a large number of time bins.

SUMMARY OF THE INVENTION

It is an aspect of this specification to set forth temporal interferometric networks based on ultrafast optical switches operating at the single photon level by means of a fully programmable, scalable and inherently phase stable quantum circuit architecture in the temporal domain.

In an embodiment, a quantum circuit is set forth, comprising a photon source for generating short duration single photon pulses, at least one temporal interferometric network for time-bin encoding each short duration single photon pulse in a single spatial mode, wherein the temporal interferometric network includes at least one optical switch, at least one birefringent material and at least one polarization element, and a photon detector for detecting time-of-arrival of photons output from the temporal interferometric network to measure the state of the photons.

In another embodiment, a temporal interferometric network is set forth, for time-bin encoding short-duration single photon pulses in a single spatial mode, comprising a cascaded series of temporal mode couplers and phase shifters, each comprising a combination of an optical switch, birefringent material and polarization element.

In the temporal domain, photons can be prepared in a superposition of time bins containing the information. According to an embodiment, an optical ultrafast temporal interferometric network element is applied to single photon pulses to form a quantum circuit in time where the overall temporal photonic state is manipulated. Since an important parameter for a temporal quantum processor is the time-bin temporal separation that dictates the physical size of the temporal interferometric network, the network element set forth herein encodes the information in time bins with bin widths, and bin separations, that are on the order of picoseconds, to take advantage of the inherent phase stability among temporal modes at this timescale. Mode coupling and phase shifting is set forth using nonlinear optical techniques in optical fibers to form an optical switch.

By combining a fiber-based optical switch with a birefringent material, and a polarization element to create the temporal mode coupler and a phase shifter, and varying the intensity and polarization of strong pump pulses, a fully-programmable quantum circuit is realized. The programmable optical ultrafast temporal interferometric network elements set forth herein can be cascaded to form a fully connected temporal circuit that is the fundamental building block of a photonic quantum processor.

The above and other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
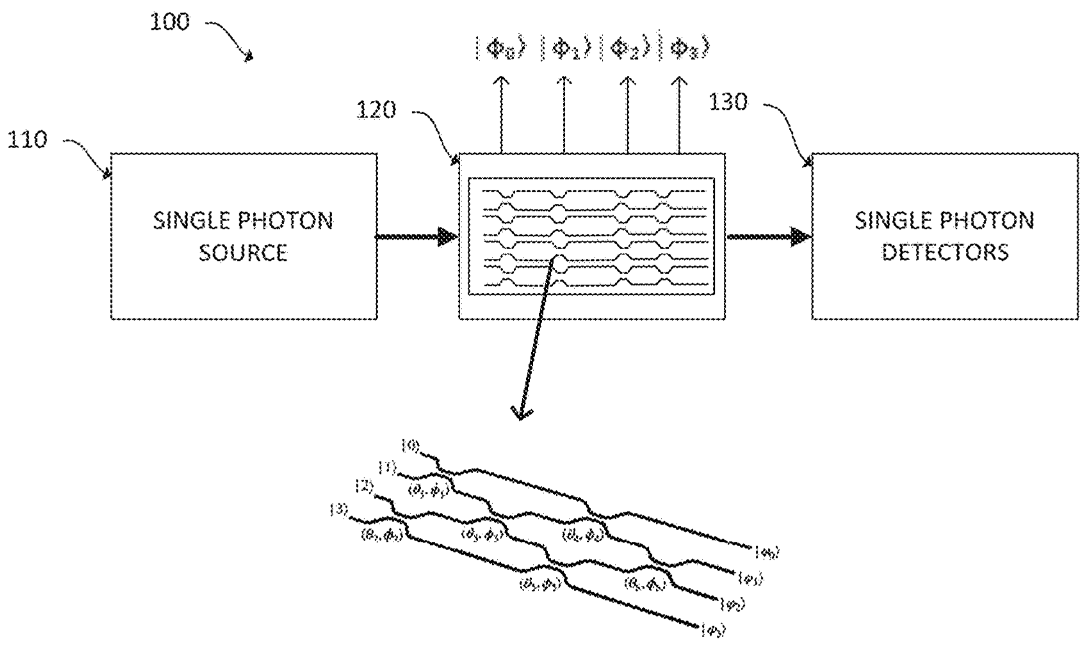
FIG. 1 shows a quantum computing system having a photonic integrated circuit for spatial encoding of single photons.

FIG. 1 shows a quantum computing system 100 for encoding of single photons in an integrated waveguide. A photon source 110 is provided for generating short duration single photon pulses. A photonic integrated circuit 120 of waveguides is provided, for spatial encoding of photons with |0>, |1>, |2>, |3> as inputs, where the strength and phase of the couplers (|θ and |ϕ) is determined during fabrication of the waveguides by varying the interaction length and curvature of the waveguides (solid lines). The interaction length (distance over which two waveguides are close together) must be implemented with a precision on the order of the wavelength of light passing through the waveguides. For N modes, the number of couplers required is equal to N(N−1)/2. Thus, in FIG. 1, N=4 modes, which corresponding to six couplers. The parameters $\theta_i$ and $\phi_i$ correspond to the coupling ratio of the couplers and the relative phase of the output modes, respectively.

A photon detector 130 is provided for detecting the time-of-arrival of photons output from the temporal interferometric network 120 to measure the state of the photons.

In an embodiment, the photon source 110 comprises a laser source, while in other embodiments probabilistic photon sources, fiber-based photon sources, quantum dot sources or squeezed light sources (e.g. produced using nonlinear optics), may be used. In embodiments, photon detector 130 may be implemented using avalanche photodiodes (APDs), superconducting nanowire detectors or photon-number resolving detectors with picosecond temporal resolution.

Figure 2:
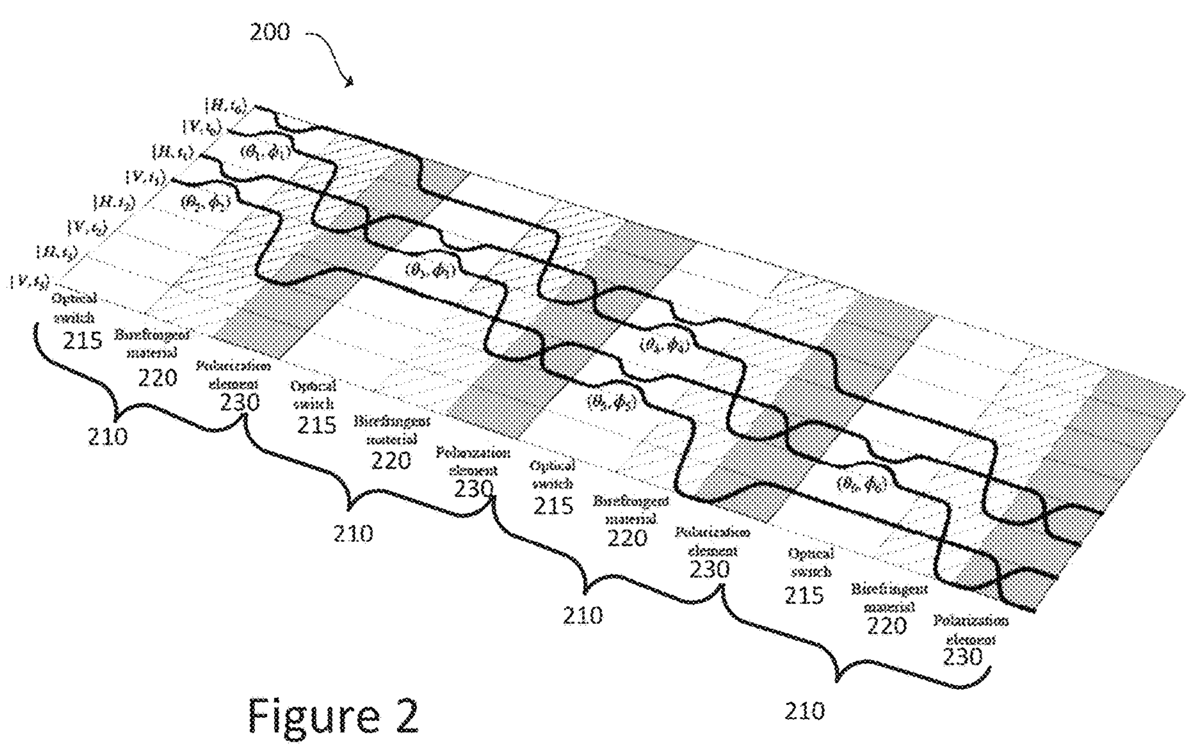
FIG. 2 shows a temporal interferometric network, according to an embodiment.

Turning now to FIG. 2, an exemplary temporal interferometric network 200 is represented in the temporal and polarization degrees of freedom, according to an embodiment, that uses temporal encoding and integrated photonics to arbitrarily manipulate the photonic states of photons in waveguides by adjusting the coupling ratio and relative phase of the temporal mode couplers. At least one temporal mode coupler and phase shifter 210 is provided for time-bin encoding short duration single photon pulses in a single spatial mode. In particular, information is encoded in time bins that are separated by hundreds of femtoseconds to tens of picoseconds, also known as ultrafast time-bins (see F. Bouchard, D. England, P. J. Bustard, K. Heshami, and B. Sussman, PRX Quantum 3, 010332 (2022)), thereby taking advantage of the inherent phase stability among temporal modes that are separated by time scales on the order of femtoseconds to picoseconds. Since the information is encoded in the temporal degree of freedom, the quantum processor can be integrated into a single spatial mode. In an embodiment, the temporal interferometric network 200 is implemented using fiber optics for ease of integration with a photon source, such as photon source 110 in FIG. 1, and a photon detector, such as photon detector 130 in FIG. 1, as well as compatibility with telecommunication infrastructures.

In an embodiment, temporal interferometric network 200 includes a cascaded sequence of temporal mode couplers and phase shifters 210, each comprising a combination of an optical switch 215, birefringent materials 220 and polarization elements 230. The temporal mode couplers are achieved using optical switches 215, where the $\theta_i$ and $\phi_i$ parameters are determined by varying the pulse energy and polarization of the pump pulses in the optical switches 215. The birefringent materials 220 and polarization elements 230 are used to rearrange the circuit to be equivalent to the photonic integrated circuit 120 shown in FIG. 1. Mode couplers and phase shifters 210 are achieved using a strong laser pulse from a photon source, such as photon source 110 at a separate wavelength from the quantum signal, relying on the optical nonlinearity of fibers in the presence of the strong laser pulses and the optical Kerr effect (see C. Kupchak, J. Erskine, D. England, and B. Sussman, Optics letters 44, 1427 (2019), to form the optical switch 210 inside the fiber (or a nonlinear bulk crystal). Combining optical switch 210 with birefringent material 220 (e.g. Barium Borate, Quartz, Calcite or other suitable birefringent material) to enable the coupling of adjacent time bins, and polarization element 230, results in the temporal mode coupler followed by phase shifter 200, which are important elements of a quantum processor. By varying the intensity and polarization of photon pulses from photon source 110, a fully-programmable temporal interferometric network element 120 is realized. Multiple temporal interferometric networks 120 can be cascaded to form a quantum circuit that can form the foundation of a photonic quantum processor. It is also possible to use a single temporal interferometric network 120 inside a cavity to achieve the same effect of cascading several temporal interferometric networks 120.

Figure 3:
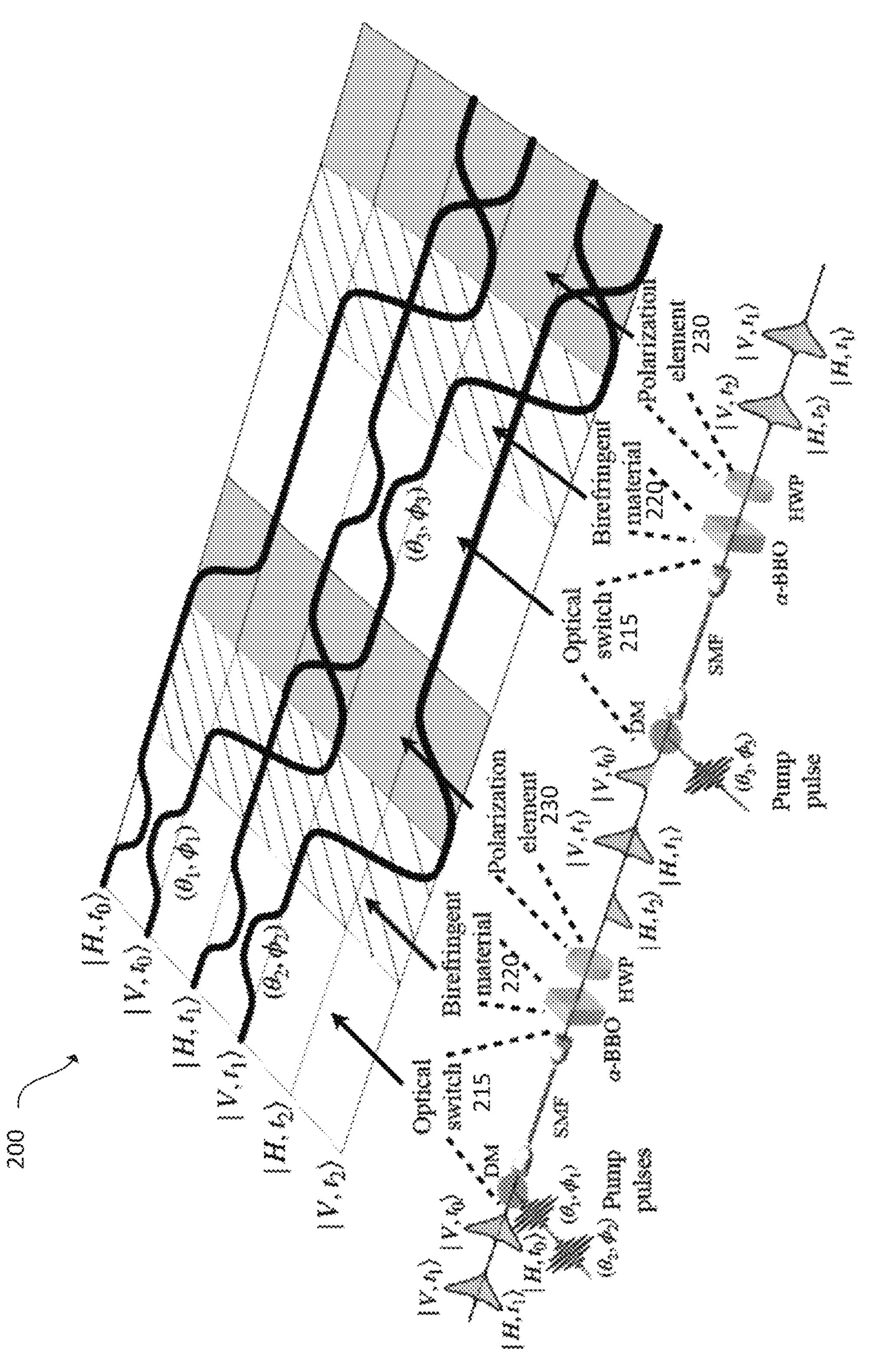
FIG. 3 is an equivalent circuit of the temporal interferometric network of FIG. 2, and a physical implementation thereof.

FIG. 3 is an equivalent circuit of the temporal interferometric network 120 and a physical implementation thereof. The input state for network 120 is a superposition of all 4 modes i.e. $|H, t_0\rangle$, $|V, t_0\rangle$, $|H, t_1\rangle$, $|V, t_1\rangle$ ) Polarization is represented by the orientation of the pulses The input modes are sent to the optical switch 210 consisting of a plurality of strong pump pulses that are made to overlap with the input photons in a single mode fiber (SMF) using a dichroic mirror (DM). In FIG. 3, two pump pulses are shown for the example of four modes (solid lines), although in general the number of strong pump pulses at this point is N/2 (if N is even) and (N−1)/2 (if N is odd). The strong pump pulses induce a polarization rotation on each input states depending on their pulse energy and polarization. This polarization rotation is achieved via cross-phase modulation based on the optical Kerr effect in the SMF. After coupling out of the SMF, the time-bin states are sent to an α-BBO crystal and a half-wave plate (HWP) acting as the birefringent material 220 and the polarization element 230, respectively. The time-bin states are then sent to a second set of optical switches 210, birefringent materials 220, and polarization elements 230. However, in the second stage, a single pump pulse is required (for the specific example of four modes (four solid lines), although in general the number of strong pump pulses at this point is (N−1)/2 (if N is even) and N/2 (if N is odd) to overlap with the appropriate time-bin state, as shown in FIG. 3.

Experimental results indicate that the temporal interferometric network 120 set forth herein can support more than 1000 time bins in a single fiber, and use of ultrafast optical pulses from photon source 110 can result in processing speeds exceeding 1 MHz, with potential for scalability to a large number of modes, which is an advantage over many photonic quantum technologies.

Compared to prior art approaches based on spatial modes, the temporal interferometric network set forth herein has a significant potential for scalability and integration, which can be important to achieve a quantum computational advantage. Compared to temporal approaches, the temporal interferometric network set forth herein operates at a smaller timescale, resulting in more compact components and improved stability. Moreover, shorter single photon pulse durations allow much larger overall processing rates, which can be an important consideration in quantum information processing tasks.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A quantum computing system, comprising:

a photon source for generating short-duration single photon pulses;

at least one temporal interferometric network element for time-bin encoding each short-duration single photon pulse in a single spatial mode, wherein the temporal interferometric network element includes a plurality of optical switches, birefringent material, and polarization elements combined to form a cascaded sequence of temporal mode couplers and phase shifters; and a photon detector for detecting time-of-arrival of photons output from the temporal interferometric network to measure the state of the photons;

wherein varying the intensity and polarization of the photon pulses programs the temporal interferometric network element.

2. The quantum computing system of claim 1, wherein the temporal interferometric network element encodes the short duration single photon pulses in time bins of duration of hundreds of femtoseconds to tens of picoseconds.

3. The quantum computing system of claim 1, wherein the at least one temporal interferometric network element is formed inside an optical fiber.

4. The quantum computing system of claim 1, wherein the at least one temporal interferometric network element is formed inside a nonlinear bulk crystal.

5. The quantum computing system of claim 1, wherein the temporal mode coupler and phase shifter are formed using a strong laser pulse at a separate wavelength from the quantum signal, the strong laser pulse having an intensity sufficient to induce a measurable Kerr-effect polarization rotation on the single photon pulses.

6. The quantum computing system of claim 3, wherein the at least one optical switch is formed inside the optical fiber using the optical Kerr effect.

7. The quantum computing system of claim 4, wherein the at least one optical switch is formed inside the nonlinear bulk crystal using the optical Kerr effect.

8. The quantum computing system of claim 4, wherein the birefringent material is one of either Barium Borate, Quartz or Calcite.

9. The quantum computing system of claim 1, wherein the photon source comprises a laser source for generating short duration single photon pulses.

10. A temporal interferometric network element for time-bin encoding short-duration single photon pulses in a single spatial mode, comprising a cascaded series of temporal mode couplers and phase shifters, each comprising a combination of an optical switch, birefringent material and polarization element, wherein each temporal mode coupler is configured to couple time bins of the single photon pulses.

11. The temporal interferometric network of claim 10, wherein the at least one optical switch is formed inside an optical fiber using the optical Kerr effect.

12. The temporal interferometric network of claim 10, wherein the at least one optical switch is formed inside a nonlinear bulk crystal using the optical Kerr effect.

13. The temporal interferometric network of claim 10, wherein the birefringent material is one of either Barium Borate, Quartz or Calcite.

* * * * *